(12) United States Patent
Wei et al.

(10) Patent No.: US 12,010,642 B2
(45) Date of Patent: Jun. 11, 2024

(54) ENTITIES FOR PROVIDING AN EXTERNAL SERVICE TO A NETWORK

(71) Applicant: Huawei Technologies Co., Ltd., Shenzhen (CN)

(72) Inventors: Qing Wei, Munich (DE); Riccardo Trivisonno, Munich (DE); Clarissa Marquezan, Munich (DE); Runze Zhou, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 353 days.

(21) Appl. No.: 17/404,624

(22) Filed: Aug. 17, 2021

(65) Prior Publication Data

US 2022/0030537 A1 Jan. 27, 2022

Related U.S. Application Data

(63) Continuation of application No. PCT/EP2019/053989, filed on Feb. 18, 2019.

(51) Int. Cl.
*H04W 60/00* (2009.01)
*H04W 48/16* (2009.01)

(52) U.S. Cl.
CPC .......... *H04W 60/00* (2013.01); *H04W 48/16* (2013.01)

(58) Field of Classification Search
CPC .............................. H04W 48/16; H04W 60/00
USPC ...................................... 455/435.1
See application file for complete search history.

(56) References Cited

U.S. PATENT DOCUMENTS

| 2018/0270778 A1* | 9/2018 | Bharatia ................. H04L 65/80 |
| 2019/0053104 A1 | 2/2019 | Qiao et al. |
| 2021/0195506 A1* | 6/2021 | Bartolomé Rodrigo ..................... H04L 67/51 |

(Continued)

FOREIGN PATENT DOCUMENTS

| CN | 104322136 A | 1/2015 |
| WO | 2018127148 A1 | 7/2018 |
| WO | 2019024679 A1 | 2/2019 |

(Continued)

OTHER PUBLICATIONS

Intel, Convida Wireless, ATandT, NTT Docomo, Huawei, HiSilicon, "Architecture Assumption for External Exposure," SA WG2 Meeting #127-Bis, Newport Beach, CA, USA, S2-185795 (revision of S2-185202, S2-185740), total 4 pages, 3rd Generation Partnership Project, Valbonne, France (May 28-Jun. 1, 2018).

(Continued)

*Primary Examiner* — Hirdepal Singh
(74) *Attorney, Agent, or Firm* — Leydig, Voit & Mayer, Ltd.

(57) ABSTRACT

A method supports transfer of service traffic between an external network entity and a second network entity. The method includes: sending, by the second network entity, a first transfer request to a first network entity, wherein the transfer request includes first service traffic; receiving, by the first network entity, the first transfer request from the second network entity, and sending, by the first network entity, a second transfer request to the external network entity, the second transfer request including the first service traffic; and receiving, by the second network entity, a fourth transfer request from the first network entity, the fourth transfer request including second service traffic.

17 Claims, 5 Drawing Sheets

(56) References Cited

U.S. PATENT DOCUMENTS

2021/0258869 A1* 8/2021 Di Girolamo ........ H04W 48/16
2023/0074564 A1* 3/2023 Mladin .................. H04W 4/50

FOREIGN PATENT DOCUMENTS

WO 2019032968 A1 2/2019
WO 2020098951 A1 5/2020

OTHER PUBLICATIONS

"3rd Generation Partnership Project; Technical Specification Group Services and System Aspects; Procedures for the 5G System; Stage 2 (Release 15)," 3GPP TS 23.502 V15.4.1, total 347 pages, 3rd Generation Partnership Project, Valbonne, France (Jan. 2019).

"3rd Generation Partnership Project; Technical Specification Group Services and System Aspects; System Architecture for the 5G System; Stage 2 (Release 15)," 3GPP TS 23.501 V15.4.0, total 236 pages, 3rd Generation Partnership Project, Valbonne, France (Dec. 2018).

"3rd Generation Partnership Project; Technical Specification Group Services and System Aspects; Procedures for the 5G System;Stage 2 (Release 15)," 3GPP TS 23.502 V15.4.0, total 346 pages, 3rd Generation Partnership Project, Valbonne, France (Dec. 2018).

"3rd Generation Partnership Project; Technical Specification Group Services and System Aspects; Study of Enablers for Network Automation for 5G (Release 16)," 3GPP TR 23.791 V16.0.0, total 121 pages, 3rd Generation Partnership Project, Valbonne, France (Dec. 2018).

"3rd Generation Partnership Project; Technical Specification Group Core Network and Terminals; 5G System; Network Function Repository Services; Stage 3 (Release 15)," 3GPP TS 29.510 V15.2.0, total 107 pages, 3rd Generation Partnership Project, Valbonne, France (Dec. 2018).

* cited by examiner

ENTITIES FOR PROVIDING AN EXTERNAL SERVICE TO A NETWORK

CROSS-REFERENCE TO RELATED APPLICATIONS

This application is a continuation of International Application No. PCT/EP2019/053989, filed on Feb. 18, 2019, the disclosure of which is hereby incorporated by reference in its entirety.

FIELD

The present disclosure relates to external services provided to a network. In particular, the disclosure proposes devices (network entities) that are involved in the registration of an external network entity and/or of one or more services provided by the external network entity at another network entity. Further, the disclosure proposes devices (network entities) that are involved in the transfer of service traffic between an external network entity providing one or more services and another network entity consuming the one or more services.

BACKGROUND

An external network entity, like a $3^{rd}$ party (3P) Application Function (AF), may have additional capabilities, which can help a network to provide better services or improve the network operation efficiency. For instance, a Vehicle-to-anything (V2X) application (e.g., a navigation application) may provide User Equipment (UE) trajectory information to a 5G System (5GS). The 5GS can use this information to manage/plan network resources, in order to better satisfy V2X communication service requirements, and to make more efficient usage of network resources. The information could also be used by the 5GS to access the network capability, and to notify the V2X application in advance, if the expected service quality for a V2X communication service is in risk to be degraded. Furthermore, in industry communication use cases, a time monitoring capability from a 3P AF (e.g., a Time Sensitive Network (TSN), real time application) may provide a reference to the 5GS for a better end-to-end latency control.

However, in the current $3^{rd}$ generation partnership project (3GPP) Rel. 15 there is foreseen only limited capability exposure from an external AF to the 5GS. In particular, the 5GS supports external exposure of network capabilities, comprising [see TS 23.502 v.1.4.1 section 4.15.1]:

Exposure of network events externally as well as internally towards core network NFs;

Exposure of provisioning capability towards external functions;

Exposure of policy and charging capabilities towards external functions;

Exposure of core network internal capabilities for analytics.

Exposure of provisioning capability towards external functions allows external party to provision of information which can be used for the UE in 5GS.

Further, Network Exposure Function (NEF) services cover only very specific cases (e.g., parameter provision, UE trigger from the AF, etc.) as shown below in Table 1.

TABLE 1

TR 23.501 v. 1.4.1 Table 7.2.8-1 Network Function (NF) Services provided by NEF.

| Service Name | Description | Reference in TS 23.502 [3] |
|---|---|---|
| Nnef_EventExposure | Provides support for event exposure | 5.2.6.2 |
| Nnef_PFDManagement | Provides support for PFDs management | 5.2.6.3 |
| Nnef_ParameterProvision | Provides support to provision information which can be used for the UE in 5GS | 5.2.6.4 |
| Nnef_Trigger | Provides support for device triggering | 5.2.6.5 |
| Nnef_BDTPNegotiation | Provides support for negotiation about the transfer policies for the future background data transfer | 5.2.6.6 |
| Nnef_TrafficInfluence | Provide the ability to influence traffic routing. | 5.2.6.7 |
| Nnef_ChargeableParty | Requests to become the chargeable party for a data session for a UE. | 5.2.6.8 |
| Nnef_AFsessionWith QoS | Requests the network to provide a specific QoS for an AS session. | 5.2.6.9 |

For external parameter provision, there are also severe limitations (see e.g. the detailed procedure in TS 23.502 V1.4.1 section 4.15.6 "External Parameter Provisioning"), in particular:

1. Lack of flexibility: External parameters need to be pre-configured (e.g., by operations, administration, and maintenance (OAM)). Currently they are limited to the information related to a single UE or a group of UE. There is no support for service/slice related information. There is also no general procedure to discover newly added external (3P AF) services. A dedicated service definition for different exposure cases is not provided (for complicity of service design).

2. Inefficient communication between 3P AF and 5GS: The 5GS cannot actively ask for the parameters for a certain time period (e.g., working days), with certain granularities (e.g., per UE/per service) and a certain format (e.g., average, maximum, standard deviation (STD) variation) per use case of the parameters. Current solutions only include a valid time as parameter of the external parameters.

3. Long latency between information provider and information consumer: In the current procedures, the external parameters are stored at Unified Data Management (UDM) or a Unified Data Storage (UDR), before they go to the actual consumers of external parameters. This is not suitable for cases, in which real time external information is needed.

4. Limited service exposure from 3P AF: External parameter provision is a limited capability of 3P AF. The 3P could provide services to the 5GS, such as to adjust its traffic pattern/configuration, in order to achieve joint optimization with the 5GS consideration End-to-End (e2e) service requirements, and expose 3P events to the 5GS.

In one special case of a Network Data Analytic Function (NWDAF), TR 23.791 defines that data from AFs (3P AFs) can be collected by the NWDAF. However, it is left for further study to define, how the NWDAF may actually know, which 3P AF can be used for data collection, and which data and/or services such AFs offer.

SUMMARY

In view of the above, embodiments of the present disclosure improves the current implementations. For example, an embodiment provides a mechanism that enables an external network entity, e.g. a 3P AF, to expose its service(s) to a network, e.g. to a 5GS. An embodiment enables a network entity, e.g. a 5G NF, to discover the service(s) provided by an external network entity. An embodiment enables a network entity, e.g. a 5G NF, to use (consume) the service(s) provided by an external network entity.

In this document, a "service", e.g. provided by an external network entity, includes both a general sense "service" and "information".

Embodiments of the disclosure provide network entities and methods, which support/enable the integration of one or more external services into a network, particularly into a 5G core (5GC) Service Based Architecture (SBA). An exemplary embodiment is a network entity, e.g. a NEF, which interacts between another network entity and an external network entity. Embodiments of the disclosure relate, for example, to a "registration service" for an external network entity or its service(s), and to a "transfer service" for external service traffic transfer from the external network entity to the network. The "registration service" and "transfer service" may be provided by the network entity, e.g. the NEF.

A first aspect provides a network entity for supporting registration of an external network entity and/or one or more services of the external network entity at another network entity, wherein the network entity is configured to: obtain a first registration information of the external network entity, wherein the first registration information includes a profile of the external network entity, provide a second registration information, to the other network entity, wherein the second registration information includes profile information based on said profile of the external network entity, obtain a first registration response from the other network entity, and provide a second registration response to the external network entity.

Obtaining registration information may generally include receiving a registration/registration update request, receiving a subscription request, or performing a registration through configuration. Sending registration information may generally include sending a registration/registration update request, sending a subscription request, or performing a registration through configuration. In the configuration cases, the network entity may be configured (for example at startup) by a management entity (for example by the OAM) in the management plane of the network. The registration information can come from the external entity. The first registration response is in particular provided in response to the second registration information.

The profile information (or "enhanced profile") in the second registration information may be the profile that is included in the obtained first registration information, or may be said profile plus additional information e.g. additional proxy information (like the identification (ID) and/or address of the network entity of the first aspect).

The network entity of the first aspect enables the external network entity to expose its service(s) to the other network entity in the network. In particular, it also enables the other network entity to discover the service(s) of the external network entity. Thus, the network can employ the capabilities provided by the external network entity.

In an implementation of the first aspect, the network entity is a NF, in particular a NEF, the other network entity is a NF, in particular a Network Repository Function (NRF) and/or the external network entity is a network function (NF) configured to communicate with the other network entity only via the network entity, in particular an AF.

In an implementation of the first aspect, the first registration information further includes addressing information related to the external network entity to be used for invoking the service of the external network entity.

Thus, the other network entity may later invoke the service(s) of the external network entity through the network entity.

In an implementation of the first aspect, the second registration information further includes at least one of: information about one or more network entities serving as a proxy for the external network entity, Single Network Slice Selection Assistance Information (S-NSSAI), associated with the service, a Data Network Name (DNN) associated with the service, an identification (ID) of one or more UEs associated with the external network entity.

The information about one or more network entities can be the NF ID/address. Thus, the other network entity can later invoke the service(s) of the external network entity by using this information.

In an implementation of the first aspect, the network entity is further configured to expose to another network entity the second registration information based on configuration information.

Thus, the other network entity may be aware of the external network entity and its provided service(s).

In an implementation of the first aspect, the second registration information further includes restriction information indicating one or more restrictions of the service.

Thus, the discovery and/or use of the service provided by the external network entity may be restricted, e.g. may be enabled for some dedicated network entities.

In an implementation of the first aspect, the second registration information includes correlation information between the network entity and the external network entity and/or a service of the external network entity.

Thus, the external network entity easily knows, which network entity is used for which of its service(s), in order to communicate (e.g. the service traffic) with the network.

In an implementation of the first aspect, the network entity is further configured to obtain a discovery request from the external network entity for discovering one or more network services, provide the discovery request to the other network entity, obtain a discovery response from the other network entity, and provide the discovery response to the external network entity.

Network services may be services provided by the network functions (like Access Management Function (AMF), Session Management Function (SMF)). Providing the discovery request and/or response can again be implemented by sending it.

A second aspect provides an external network entity, in particular an AF, for providing a service to a network entity, and configured to: provide registration information to the network entity, in particular to a NEF, wherein the registration information includes a profile of the external network entity, and obtain a registration response from the network entity, wherein the registration response includes correlation information between the network entity and the service and/or external network entity.

Providing registration information may again generally include sending a registration/registration update request, sending a subscription request, or performing a registration through configuration. Obtaining registration response may again generally include receiving a registration/registration update response, receiving a subscription response, or performing a registration through configuration.

The network entity of the second aspect is able to request registration of itself and/or services it provides at a network entity in the network. It thus is able to provide its service(s) to the network, and network entities in the network are enabled to discover the (external) network entity of the second aspect and/or its service(s).

A third aspect provides a network entity, in particular a NRF, for registering an external entity and/or one or more services provided by the external network entity, wherein the network entity is configured to: receive registration information from another network entity, in particular from a NEF, wherein the registration information includes profile information based on a profile of the external network entity and addressing information related to the network entity to be used for invoking the service, register the external entity and/or the one or more services provided by the external entity based on the registration information, and send a registration response to the other network entity.

The network entity of the third aspect can register the external network entity or its service(s), and can thus allow other network entities in the network to discover and use the service(s). The network entity is associated with a particular other network entity, through which it communicates with the external network entity.

In an implementation of the third aspect, the network entity is configured to: expose the service to one or more other network entities, in particular NFs, and/or support discovery of the service by one or more other network entities, in particular NFs.

A fourth aspect provides a network entity for supporting transfer of service traffic between an external network entity and another network entity, wherein the network entity is configured to: receive a first transfer request from the other network entity, wherein the first transfer request includes first service traffic, and send a second transfer request to the external network entity, wherein the second transfer request includes the first service traffic.

The network entity of the fourth aspect enables the external network entity to expose its service(s) to the other network entity in the network. In particular, it also enables the other network entity to use the service(s) and capabilities provided by the external network entity.

In an implementation of the fourth aspect, the network entity is configured to expose to other network entities the second transfer request based on configuration information.

In an implementation of the fourth aspect, the configuration information includes at least one of an ID and/or address of the source/destination network entity, an ID of a service, bit rate, traffic volume, time duration.

In an implementation of the fourth aspect, the network entity is a NF, in particular a NEF, the other network entity is a NF, and/or the external entity is a NF, particularly an AF.

In an implementation of the fourth aspect, the first transfer request further includes at least one of: an ID of the service, an ID of the first transfer request, an ID of the external entity, a container with the to be transferred service traffic.

In an implementation of the fourth aspect, the second transfer request further includes correlation information between the network entity and the service and/or external network entity.

Thus, the external network entity knows for a given service which network entity it communicates with (e.g. the service traffic).

In an implementation of the fourth aspect, the network entity is further configured to: receive a third transfer request from the external network entity including second service traffic, and send a fourth transfer request to the other network entity including the second service traffic.

A fifth aspect provides a network entity, in particular a NF, for consuming a service provided by an external network entity, wherein the network entity is configured to: send a transfer request to another network entity, in particular to a NEF, wherein the transfer request includes first service traffic, receive a transfer request from the other network entity including second service traffic.

The network entity of the fifth aspect may thus discover and use the external network service(s) efficiently through the other network entity.

In an implementation of the fifth aspect, the network entity is further configured to: discover the service by invoking a service discovery at another network entity, in particular at a NRF.

A sixth aspect provides an external network entity, in particular a NF, for providing a service to a network entity, wherein the external network entity is configured to: receive a transfer request from a network entity, in particular from a NEF, wherein the transfer request includes first service traffic, process the first service traffic, and send a transfer request to the network entity including second service traffic.

The external network entity of the sixth aspect may thus advantageously provide its service(s) to the network through the network entity. The second service traffic may be based on the processing of the first service traffic.

A seventh aspect provides a network entity for supporting transfer of service traffic between an external network entity and another network entity, wherein the network entity is configured to: receive a traffic transfer subscription request from the network entity and respond with a traffic transfer subscription response, receive a transfer request from the network entity and notify the destination network entity with the transfer event notification.

In an implementation of the seventh aspect, the traffic transfer subscription request includes at least one of: an ID of the request network entity, an ID of the transfer request, an ID of the notification target.

In an implementation of the seventh aspect, the transfer event notification includes at least one of: Correlation information between the network entity and the service and/or external network entity, an ID of the transfer request, and a container with the transferred service traffic.

An eighth aspect provides a method for supporting registration of an external network entity and/or one or more services of the external network entity at another network entity, wherein the method comprises: obtaining a first registration information of the external network entity, wherein the first registration information includes a profile of the external network entity, providing a second registration information, to the other network entity, wherein the second registration information includes profile information based on said profile of the external network entity, obtaining a first registration response from the other network entity, and providing a second registration response to the external network entity.

The method of the eighth aspect can be implemented according to the implementations described above for the network entity of the first aspect. Thus, the method and its implementations achieves all advantages and effects as described above for the network entity of the first aspect and its implementations, respectively.

A ninth aspect provides a method for providing a service to a network entity, the method comprising: providing registration information to the network entity, in particular to a NEF, wherein the registration information includes a profile of the external network entity, and obtaining a registration response from the network entity, wherein the registration response includes correlation information between the network entity and the service and/or external network entity.

The method of the ninth aspect can be implemented according to the implementations described above for the external network entity of the second aspect. Thus, the method and its implementations achieves all advantages and effects as described above for the external network entity of the second aspect and its implementations, respectively.

A tenth aspect provides a method for registering an external entity and/or one or more services provided by the external network entity, wherein the method comprises: receiving registration information from another network entity, in particular from a NEF, wherein the registration information includes profile information based on a profile of the external network entity and addressing information related to the network entity to be used for invoking the service, registering the external entity and/or the one or more services provided by the external entity based on the registration information, and sending a registration response to the other network entity.

The method of the tenth aspect can be implemented according to the implementations described above for the network entity of the third aspect. Thus, the method and its implementations achieves all advantages and effects as described above for the network entity of the third aspect and its implementations, respectively.

An eleventh aspect provides a method for supporting transfer of service traffic between an external network entity and another network entity, wherein the method comprises: receiving a first transfer request from the other network entity, wherein the first transfer request includes first service traffic, and sending a second transfer request to the external network entity, wherein the second service transfer request includes the first service traffic.

The method of the eleventh aspect can be implemented according to the implementations described above for the network entity of the fourth aspect. Thus, the method and its implementations achieves all advantages and effects as described above for the network entity of the fourth aspect and its implementations, respectively.

A twelfth aspect provides a method for consuming a service provided by an external network entity, wherein the method comprises: sending a transfer request to another network entity, in particular to a NEF, wherein the transfer request includes first service traffic, and receiving a transfer request from the other network entity including second service traffic.

The method of the twelfth aspect can be implemented according to the implementations described above for the network entity of the fifth aspect. Thus, the method and its implementations achieves all advantages and effects as described above for the network entity of the fifth aspect and its implementations, respectively.

A thirteenth aspect provides a method for providing a service to a network entity, wherein the method comprises: receiving a transfer request from a network entity, in particular from a NEF, wherein the transfer request includes first service traffic, processing the first service traffic, and sending a transfer request to the network entity including second service traffic.

The method of the thirteenth aspect can be implemented according to the implementations described above for the external network entity of the sixth aspect. Thus, the method and its implementations achieves all advantages and effects as described above for the network entity of the sixth and its implementations, respectively.

A fourteenth aspect provides a method for supporting transfer of service traffic between an external network entity and another network entity, wherein the method comprises: receiving a traffic transfer subscription request from the network entity and responding with a traffic transfer subscription response, receiving a transfer request from the network entity and notifying the destination network entity with the transfer event notification.

The method of the fourteenth aspect can be implemented according to the implementations described above for the network entity of the seventh aspect. Thus, the method and its implementations achieves all advantages and effects as described above for the network entity of the seventh and its implementations, respectively.

A fifteenth aspect provides a computer program product for storing program code for performing at least one of the methods according to the eight to the fourteenth aspect, when the program code is run by a processor.

It has to be noted that all devices, elements, units and means described in the present application could be implemented in the software or hardware elements or any kind of combination thereof. All steps which are performed by the various entities described in the present application as well as the functionalities described to be performed by the various entities are intended to mean that the respective entity is adapted to or configured to perform the respective steps and functionalities. Even if, in the following description of specific embodiments, a specific functionality or step to be performed by external entities is not reflected in the description of a specific detailed element of that entity which performs that specific step or functionality, these methods and functionalities can be implemented in respective software or hardware elements, or any kind of combination thereof.

BRIEF DESCRIPTION OF DRAWINGS

The above described aspects and implementations of the present disclosure will be explained in the following description of specific embodiments in relation to the enclosed drawings, in which.

DETAILED DESCRIPTION

Figure 1:
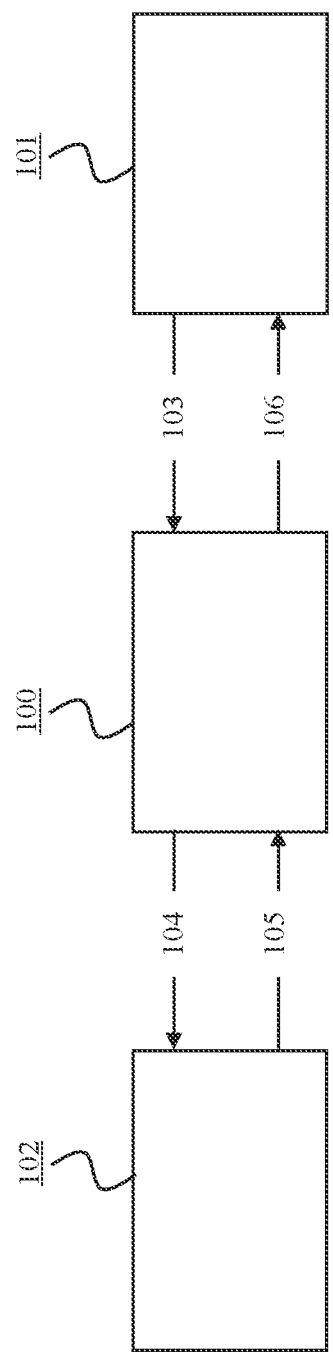
FIG. 1 shows network entities according to embodiments of the disclosure involved in a registration procedure.

FIG. 1 shows a network entity 100 according to an embodiment of the disclosure, an external network entity 101 according to an embodiment of the disclosure, and another network entity 102 according to an embodiment of the disclosure. The network entity 100 is configured to support registration of the external network entity 101 and/or one or more services of the external network entity 101 at the other network entity 102. The external network entity 101 is configured to provide a service to the network entity 100. The other network entity 102 is configured to register the external entity 101 and/or the one or more services of the external network entity 101. The network entities 100, 101 and 102 may be, or may be implemented by, processing circuitry or devices. In particular, the network entities 100, 101, and 102 may be implemented by network devices (e.g. one or more base stations or access nodes) and/or by wireless communication devices (e.g. UEs).

The network entity 100 of FIG. 1 may be a NF, in particular a NEF. The external network entity 101 may be a NF configured to communicate with the other network entity 102 via the network entity 100, in particular may be an AF. The other network entity 102 may be a NF, in particular a NRF.

The external network entity 101 is configured to provide first registration information 103 to the network entity 100, wherein the first registration information 103 includes a profile of the external network entity 101. Accordingly, the network entity 100 may obtain the first registration information 103 of the external network entity 101 including the profile of the external network entity 101. The network entity 100 may then provide second registration information 104 to the other network entity 102, wherein the second registration information 104 includes profile information based on said profile of the external network entity 101, i.e. may include the profile or an enhanced/amended profile. The second registration information 104 may further include addressing information related to the network entity 100.

Accordingly, the other network entity 102 is configured to receive the second registration information 104 including the profile information. The other network entity 102 is configured to register the external entity 101 and/or the one or the more services provided by the external entity 101, and to send a first registration response 105 to the network entity 100.

The network entity 100 is configured to obtain the first registration response 105 from the other network entity 102, and to provide a second registration response 106 to the external network entity 101. Accordingly, the external network entity 101 is configured to obtain the second registration response 106 from the network entity 100. The second registration response 106 may include correlation information between the network entity 100 and the at least one service of the external network entity 101 and/or the external network entity 101.

In the procedure described with respect to FIG. 1, the network entity 100 may thus serve as a proxy for the external network entity 101.

Figure 2:
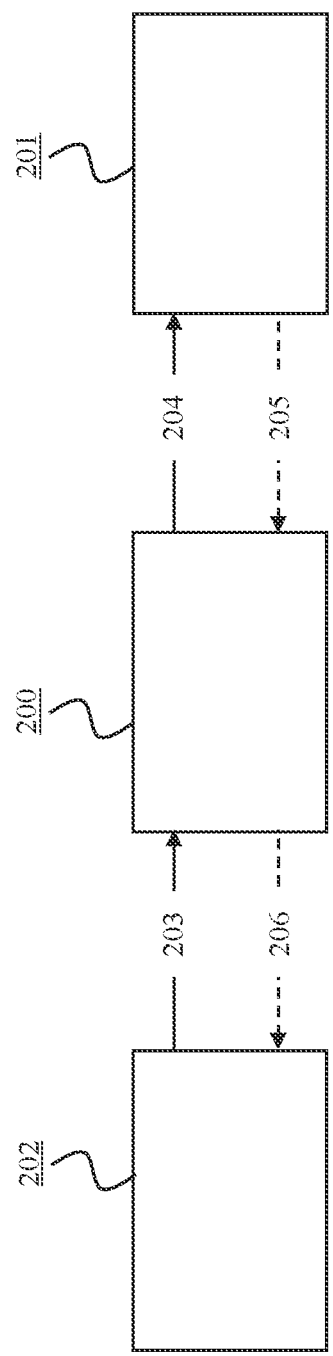
FIG. 2 shows network entities according to embodiments of the disclosure involved in a service traffic transfer procedure.

FIG. 2 shows a network entity 200 according to an embodiment of the disclosure, an external network entity 201 according to an embodiment of the disclosure, and another network entity 202 according to an embodiment of the disclosure. The network entity 200 may be the network entity 100 shown in FIG. 1. The external network entity 201 may be the external network entity 101 shown in FIG. 1. The network entity 100 is configured to support transfer of service traffic between the external network entity 201 and the other network entity 202. The external network entity 201 is configured to provide a service to the network entity 200. The other network entity 202 is configured to consume the service provided by the external network entity 201. The network entities 200, 201 and 202 may be, or may be implemented by, processing circuitry or devices. In particular, the network entities 200, 201, and 202 may be implemented by network devices (e.g. one or more base stations or access nodes) and/or by wireless communication devices (e.g. UEs).

The network entity 200 of FIG. 2 may be a NF, in particular a NEF. The external network entity 201 may be a NF, particularly an AF. The other network entity 202 may be an NF.

The other network entity 202 is configured to send a first transfer request 203 to the network entity 200, wherein the first transfer request 203 includes service traffic, e.g. a service traffic of a service invocation information. Accordingly, the network entity 200 receives the first transfer request 203 from the other network entity 202.

The network entity 200 may send a second transfer request 204 to the external network entity 201, wherein the second service transfer request 204 includes the first service traffic. The second transfer request 204 may further include correlation information between the network entity 200 and the service provided by the external network entity 201 and/or the external network entity 201. The external network entity 201 is configured to receive the second transfer request 204 from the network entity 200.

The external network entity may then be configured to process the first service traffic, and to send a third transfer request 205 to the network entity 200. The third transfer request 205 includes second service traffic, e.g. service traffic of the service invocation information, which may be based on the processing of the first service traffic. The network entity 200 may accordingly be configured to receive the third transfer request 205 from the external network entity 201, and to send a fourth transfer request 206 to the other network entity 202. The fourth transfer request 206 includes the second service traffic. The other network entity 202 is configured to receive the fourth transfer request 206 from the other network entity 200 including the second service traffic.

In the procedure described with respect to FIG. 2, the network entity 200 may thus serve as a proxy for the external network entity 201.

By means of the above-described network entities 100/200, 101/201, 102 and 202, respectively, the integration of at least one external service into a network, e.g. a 5GC SBA, is enabled. In particular, this may be realized by providing a "registration service" (FIG. 1) and a "transfer service" (FIG. 2) at the network entity 100/200, which is connected directly to the other network entities 102 and/or 202 in the network, e.g. located in the 5GC SBA, and is also connected to the external network entity 101/201, which hosts the external service(s).

The "registration service" (Nnef_Registration) and the "transfer service" (Nnef_Transfer) can be provided by the network entity 100/200 as shown in the below Table 2. The external network entity 101/201 may, for instance, function to connect a V2X application or a TSN to the 5GC control plane through the network entity 100/200.

TABLE 2

Nnef_Registration and Nnef_Transfer services

| Service Name | Description | Reference in TS 23.502 [3] |
|---|---|---|
| . . . | . . . | . . . |
| Nnef_AFsessionWithQoS | Requests the network to provide a specific QoS for an AS session. | 5.2.6.9 |
| Nnef_Registration | Provides the service for 3$^{rd}$ party AF to register at NRF | |

TABLE 2-continued

Nnef_Registration and Nnef_Transfer services

| Service Name | Description | Reference in TS 23.502 [3] |
|---|---|---|
| Nnef_Transfer | Provide the service for 5GS to communicate with 3$^{rd}$ party AF using a service based interface (SBI) | |

The "registration service" may be considered a service of the network entity 100/200, in order to register the external entity 101/201 and/or its service(s) on behalf of the external entity 101/201, and to provide the external service(s) to other network entities 202. External service(s) thereby means that the service(s) is not connected directly to the other network entities 202 consuming the service(s), e.g. network entities in the 5GC SBA framework, and/or that it may have a different service management system/format.

The registration service (service operation "Nnef_Registration") that may be provided by the network entity 100/200 to the external entity 101 is similar to the one provided by NRF described in TS23.501 section 6.2.6 and TS 23.502 Section 5.2.7. The service operation may allow the external network entity 101/201 to register (e.g. via request/response), or to ask for an update (e.g. via request/response), or to deregister (e.g. via request/response). The service operation may be implemented according to the following Table 3:

TABLE 3

Nnef_Registration service

| Service Name | Service Operations | Operation Semantics | Example Consumer(s) |
|---|---|---|---|
| Nnef_Registration | Register | Request/Response | AF |
| | Update | Request/Response | AF |
| | Deregister | Request/Response | AF |

There are two specific implementation modes envisaged for the registration service shown in Table 2 at the network entity 100/200 for registering the external network entity 101/201 and/or its service(s) at the (registration) network entity 102: proxy mode and agent mode. The proxy mode is described in this document in detail.

In the proxy mode, the network entity 100/200 receives the registration information 103 from the external network entity 101/201, and forwards such registration information 103, potentially with minor extensions, to the other network entity 102. The effect is that any allowed other network entity 202 (e.g. a NF) in the network can discover and invoke the service(s) provide by the external network entity 101/201. It will be able to see the service(s) as belonging to external network entity 101/201, but does not need to reach the external network entity 101/201 directly but via the network entity 100/200 as an intermediary (proxy).

The "transfer service" is a service provided by the network entity 100/200 to bridge the communication (e.g. service request/response) between the external network entity 101/201 and a further network entity 202, which is a service consumer (e.g. connected to 5GC SBA framework). There are again two implementation modes for the transfer service at the network entity 100/200: proxy mode and agent mode. The proxy mode is described in this document in detail.

In the proxy mode, the network entity 100/200 simply bridges the communication between the external network entity 101/201 and the further network entity 202 without understanding of the contents of this communication.

Table 4 shows the proxy mode implementation of the "transfer service" (service operation "Nnef_ProxyTransfer") and related options at the network entity 100/200.

TABLE 4

Nnef_ProxyTransfer service

| Service Name | Service Operations | Operation Semantics | Example Consumer(s) |
|---|---|---|---|
| Nnef_EventExposure | Subscribe | Subscribe/Notify | AF |
| | Unsubscribe | | AF |
| | Notify | | AF |
| . . . | | | |
| Nnef_ProxyTransfer | request | Request/Response | 5GS NFs/AF |
| | subscribe | Subscribe/Notify | 5GS NFs/AF |
| | unsubscribe | | 5GS NFs/AF |
| | status Notify | | 5GS NFs/AF |
| | event Notify | | 5GS NFs/AF |

Figure 3A:
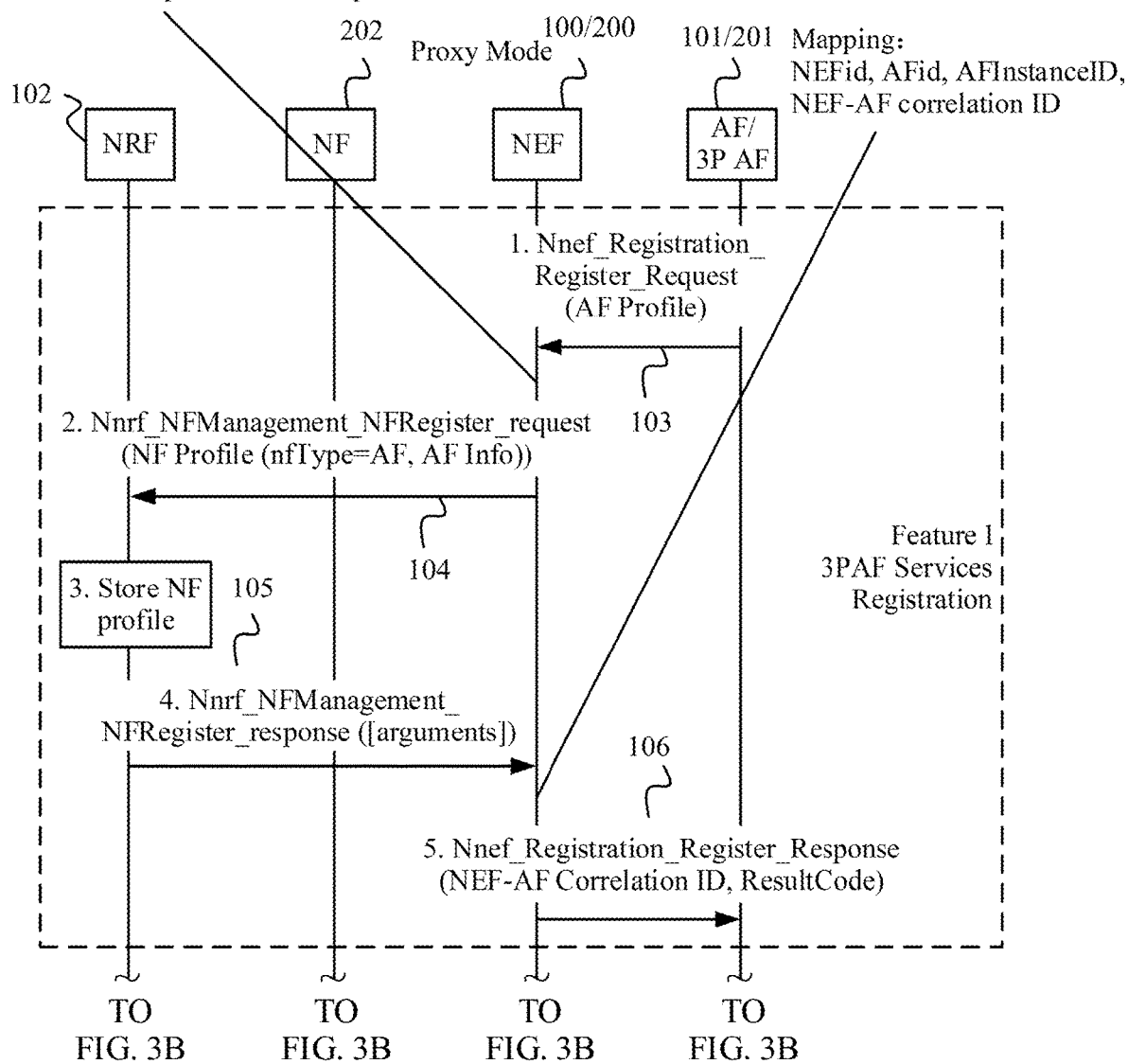
FIGS. 3A-3C show a procedure between network entities according to embodiments of the disclosure.
Figure 3B:
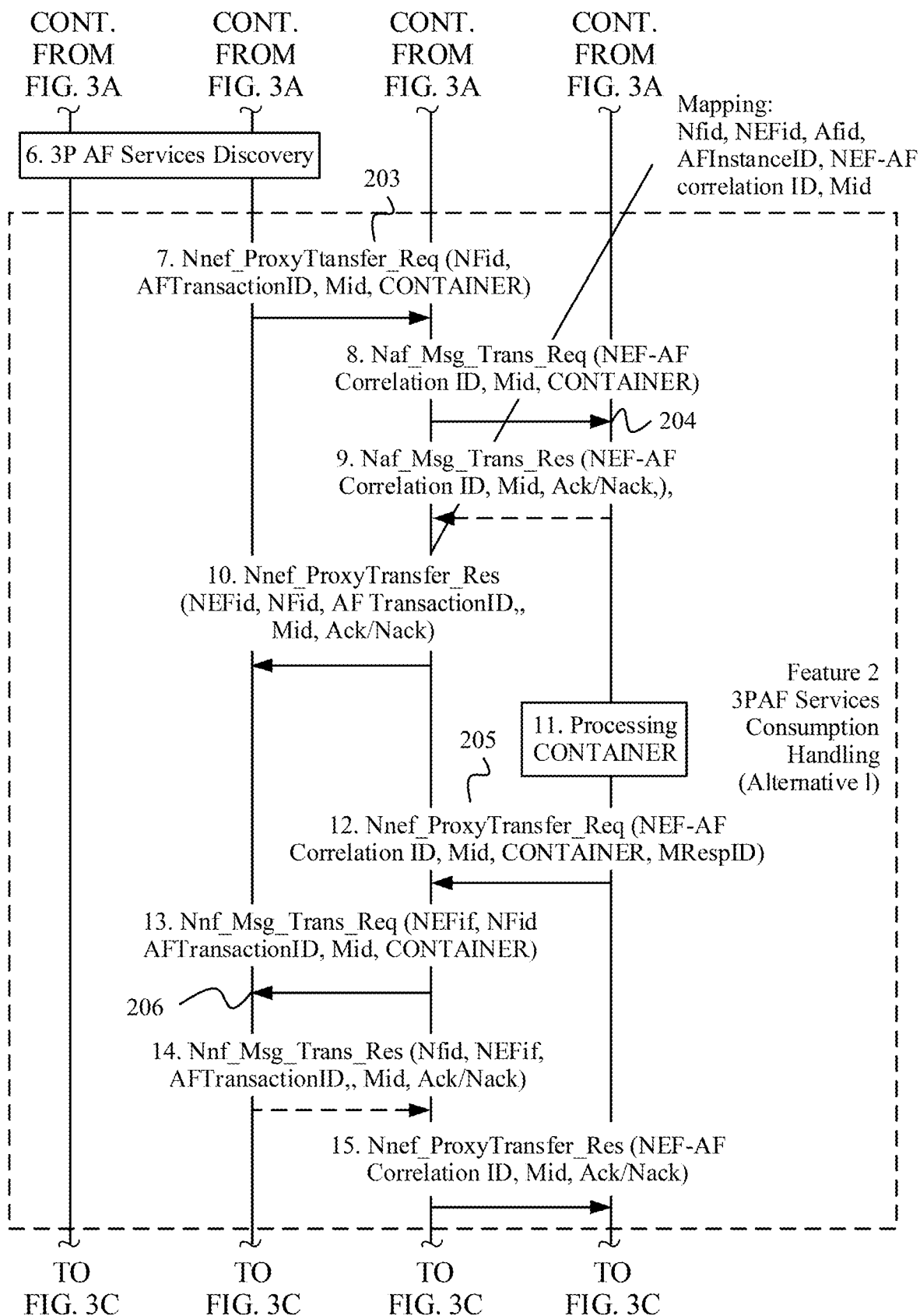
Figure 3C:
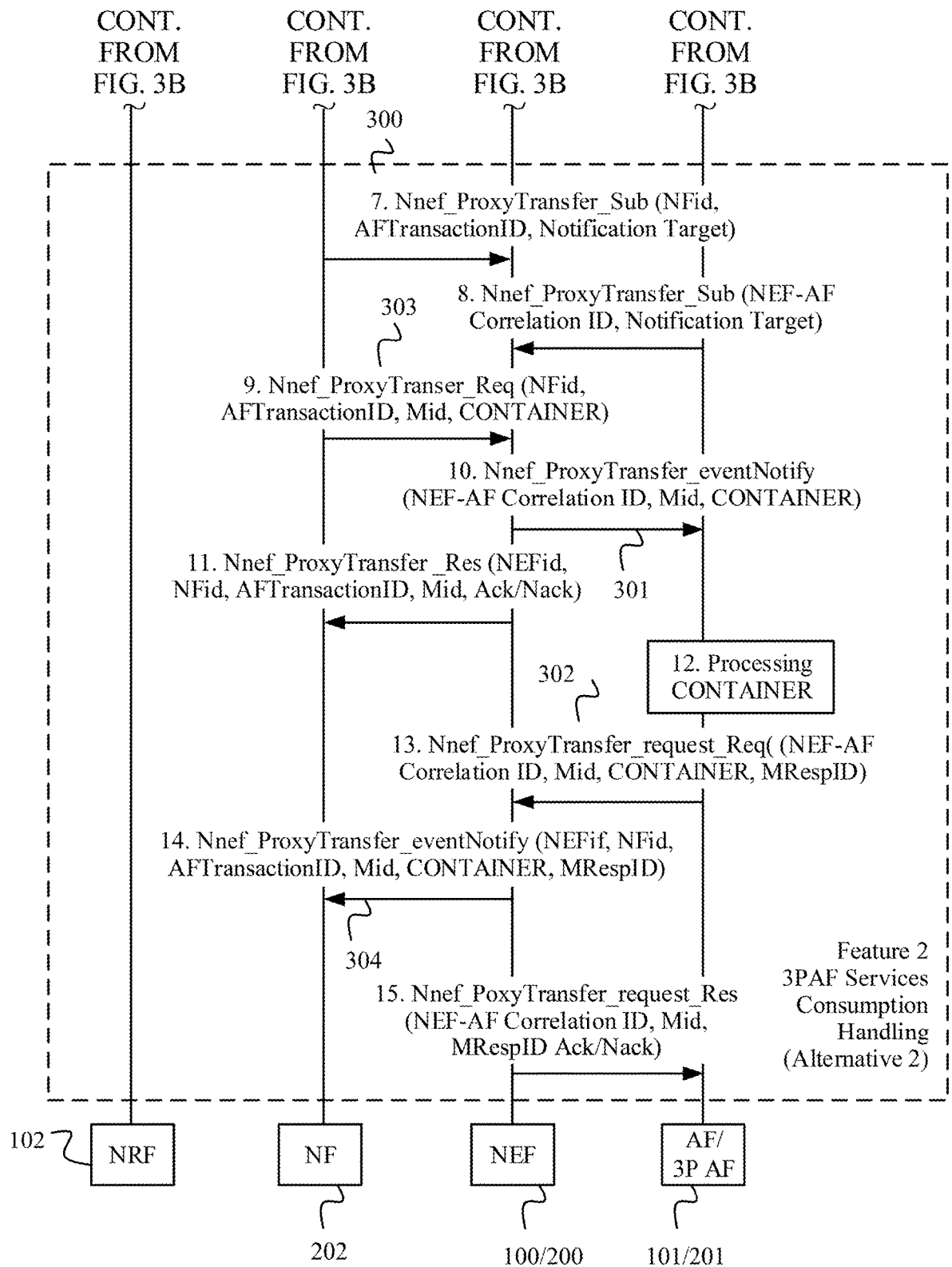

FIGS. 3A-3C show a procedure between various network entities according to embodiments of the disclosure. In particular, the procedure involves the network entity 100/200 (here a NEF), the external entity 101/201 (here an AF/3P AF), the other network entity 102 (here a NRF), and the other network entity 202 (here a NF). In particular, FIGS. 3A-3C show the procedure in proxy mode as described in this document:

The "registration service" (request/response) allows the 3P AF 101/201 to request the NEF 101/200 to register the 3P AF service(s) at the NRF 102 including the 3P AF profile. The 5Gs NFs 202 will then be able to discover the 3P AF service(s) as provided by 3P AF 101/201.

Upon service discovery, the "transfer service" allows the 5GS NFs 202 to invoke the 3P AF service(s) via the NEF 100/200, which transparently proxies any message exchange (service traffic) between the 5GS NFs 202 and the 3P AF 101/201. "Transparently" thereby refers to the unawareness of the NEF 100/200 of the actual service(s) or service traffic being provided by the 3P AF 101/201 to the NFs 202.

A detailed description of the NEF proxy mode embodiment follows. The NEF "registration service" corresponds to steps 1-5 in FIG. 3A. The NEF "transfer service" corresponds to the steps 7-15 or messages in FIG. 3B. Notably, FIGS. 3A-3C illustrate two alternative implementations of the "transfer service".

1. The 3P AF 101/201 requests the registration of its service(s) at the 5GS invoking the Nnef_Registration_Register_Request, including the 3P AF profile in the request (first registration information 103).
2. The NEF 100/200 requests the registration of the 3P AF service(s) at NRF 102 invoking the Nnrf_NFManagement_NFRegister_request. The request (second registration information 104) includes the 3P AF profile.
3. The NRF 102 stores the 3F AF profile.
4. The NRF 102 acknowledges the NEF request of step 2 by sending the Nnrf_NFManagement_NFRegister_response to NEF (first registration response 105).
5. The NEF 100/200 acknowledges the 3P AF request of step 1 by sending the Nnef_Service_Registration_Response to the 3P AF 101/201 (second registration response 106). This completes the 3P AF service registration at the 5GS, and the 5GS NFs 202 may discover the 3P AF service(s).

6. The 5GS NFs 202 may execute a (3P AF) Service Discovery procedure. The 5GS NFs 202 may now invoke the service(s) provided by 3P AF 101/201.

First alternative of the NEF "transfer service":

7. The 5GS NF 202 needs to invoke the service(s) provided by the 3P AF 101/201. The service request/subscription is created and included in CONTAINER. The request/subscription (CONTAINER) needs to be transferred to the 3P AF 101/201. The 5GS NF 202 invokes the ProxyTransfer service at the NEF 100/200 by sending a Nnef_ProxyTransfer_Req message (first transfer request 203 including first service traffic) to the NEF 100/200, including CONTAINER as an argument, which indicates the NEF 100/200 to transfer CONTAINER to the 3P AF 101/201.

8. The NEF 100/200 transfers CONTAINER to the 3P AF 101/201 invoking the AF Message Transfer service Naf_Msg_Trans_Req (second transfer request 204 including the first service traffic).

9. The 3P AF 101/201 acknowledges the transfer of CONTAINER sending the Naf_Msg_Tran_Res (transfer response) to the NEF 100/200. This step can be optional, if the acknowledge (ACK) of the receiving is not needed.

10. The NEF 100/200 acknowledges the execution of the transfer of CONTAINER by sending the Nnef_ProxyTransfer_Res (transfer response) to the 5GS NF 202.

11. The 3P AF 101/201 processes the service traffic, e.g. a service invocation, from the 5GS NF 202 included in CONTAINER.

12. The 3P AF 101/201 may need to send the Response/Notification to the 5GS NF 202 service traffic, e.g. for invoking the service. The service Response/Notification is created and included in CONTAINER. The 3P AF 101/202 invokes the ProxyTransfer service at the NEF 100/200 by sending the Nnef_ProxyTransfer_Req message (third transfer request 205 including second service traffic) to the NEF 100/200, including CONTAINER as an argument, which indicates the NEF 100/200 to transfer CONTAINER to the 5GS NF 202.

13. The 100/200 NEF transfers CONTAINER to the 5GS NF 202 invoking the NF Message Transfer service Nnf_Msg_Trans_Req (fourth transfer request 206 including the second service traffic).

14. The 5GS NF 202 acknowledges the transfer of CONTAINER sending the Nnf_Msg_Tran_Res (transfer response) to NEF 100/200.

15. The NEF 100/200 acknowledges the execution of the transfer of CONTAINER sending the Nnef_ProxyTransfer_Res (transfer response) to the 3P AF 101/201.

Notably, in steps 8, 9, 13, and 14, the CONTAINER (generally service traffic) can also be piggy backed in some other AF/NF service message instead of defining explicitly a Msg_Trans service at the AF/NF to receive the container.

Second alternative of NEF "transfer service":

7. The 5GS NF 202 subscribes to receive from the NEF 100/200 notifications of messages sent by the 3P AF 101/201 to the 5GS NF 202 via the NEF 100/200. The 5GS NF 202 sends Nnef_ProxyTransfer_Sub message to the NEF 100/200 (transfer subscription request 300).

8. The 3P AF 101/201 subscribes to receive from the NEF 100/200 notification of messages sent by the 5GS NF 202 to the 3P AF 101/201 via the NEF 100/200. The 3P AF 101/201 sends Nnef_ProxyTransfer_Sub to the NEF 100/200.

9. The 5GS NF 202 needs to send service traffic, e.g. invoke the service(s) provided by the 3P AF 101/201. The service request/subscription is created and included in the CONTAINER. The request/subscription (CONTAINER) needs to be transferred to the 3P AF 101/201. The 5GS NF 202 processes the service traffic, e.g. invokes the ProxyTransfer service provided by NEF Nnef_ProxyTransfer_Req (transfer request 303), including CONTAINER as an argument, which indicates the NEF 100/200 to transfer CONTAINER to the 3P AF 101/201.

10. The NEF 100/200 transfers CONTAINER to the 3P AF 101/201 sending the Nnef_ProxyTransfer_eventNotify (transfer event notification 301) to the 3P AF 101/201.

11. The NEF 100/200 acknowledges the execution of the transfer of CONTAINER sending the Nnef_ProxyTransfer_Res (transfer response) to 5GS NF 202.

12. The 3P AF 101/202 processes the service invocation from the 5GS NF, included in CONTAINER.

13. The 3P AF 101/201 needs to send the response/notification to the 5GS NF 202 to the service traffic, e.g. invoking the service(s). The service response/notification is created and included in CONTAINER. The 3P AF 101/201 sends the ProxyTransfer service provided by NEF Nnef_ProxyTransfer_Req (transfer request 302), including CONTAINER as argument, which indicates the NEF 100/200 to transfer CONTAINER to 5GS NF 202.

14. The NEF 100/200 transfers CONTAINER to the 5GS NF 202 sending the Nnef_ProxyTransfer_eventNotify message (transfer event notification 304) to 5GS NF 202.

15. The NEF 100/200 acknowledges the execution of the transfer of CONTAINER sending the Nnef_ProxyTransfer_AFRequest_Res to the 3P AF 101/201.

If the NEF 100/200 is implemented as a proxy (in the proxy mode), the 5GC NFs 202 consider a 3P service as a service provided by the 3P AF 101/201. And the NEF 100/200 provides the service to register the 3P service(s) to the 5GC SBA, and to bridge the communication to the 3P AF 101/201.

The proxy mode provides the following advantages:
NEF simplicity (general NEF services).
Service transparency (no need for NEF 100/200 to understand the $3^{rd}$ party AF services or service traffic).
Easy scaling (e.g., registration and transfer services can be provided by different NEF instances).

In the following, different data structures that are used by embodiments of the disclosure, e.g. as shown in FIGS. 3A-3C, are explained.

AF Transaction ID (service ID): The ID that uniquely identifies an external service is the AF Transaction ID. This is a coded ID based at least on one of information: on the owner of the 3P AF 101/201 and its service(s), the AF and/or service instance.

NEF-AF Correlation ID (NEF-AF communication channel): Unique identifier for identifying the communications associated with one specific NEF instance and one specific instance of an external service from and AF and/or AF instance.

AF Profile: Contains the same fields as NF Profile (including network service (NS)):
  In the proxy mode, the NF profile may be extended to support the extra information associated with the NF being an AF, which is defined as "AFInfo", which is information that contains at least one of:
    A list of designated NEFs 100/200 that are serving as proxy of the 3P AF 101/201 to the SBI.
    Associated S-NSSAI with external service(s).
    Associated DNNs with external service(s).
    Identification of UE IDs (e.g. list of subscription permanent identifier (SUPIs)) that are associated with the AF 101/201.
Registration Mapping: NEF 100/200 is configured by OAM with the information to map allowed NF Profile fields to the specific AFs. For instance, in case the AF profile does not contain the allowed S-NSSAI information, the NEF 100/200 may use the registration mapping configuration to further subscribe to NRF 102 with the proper fields of the NF Profile.
MID: Identifier of the message to be exchanged between a 5G NF 202 and external service(s). It is generated by the 5G NF 202 willing to invoke the external service(s) and uniquely identifies the communication associated with the specific container between NF ID, NEF ID, AF Transaction ID.
MRespID: Uniquely identify any message from external service to the NEF 100/200 associated with NEF-AF Correlation ID, Mid.
Mapping for controlling all communications between NF-AF via NEF 100/200: Such a table keeps the mapping (using above described IDs) of NF requests and responses to AF at the level of each Container. If the request from NF triggers multiple Containers from AF 101/201 to NF 202, the NEF 100/200 is able to uniquely identify each one of the answers with the MID and MRespID.

The Nnef_Registration service operation described above can be further extended to include Proxy Status Un/Subscribe/Notify service operations. These service operations enable the external network entity 101/201 to discover services provided by the network entities 202 via the network entity 100/200. This is shown below in Table 5.

TABLE 5

Extended Nnef_Registration service

| Service Name | Service Operations | Operation Semantics | Example Consumer(s) |
|---|---|---|---|
| Nnef_Registration | AFRegister | Request/Response | AF |
| | AFUpdate | Request/Response | AF |
| | AFDeregister | Request/Response | AF |
| | Proxy StatusSubscribe | Subscribe/Notify | AF |
| | Proxy StatusNotify | | AF |
| | Proxy StatusUnSubscribe | | AF |

For each Nnef_Registration_Register_Req, the NEF 100/200 may perform authorization based on the external entity 101/201, which may result in the restriction of using the service(s) according to preconfigured policy, which is called Registration Mapping. The restriction is reflected in the AFinfo registered in the network entity 102.

For each Nnef_ProxyTransfer_req/subscription, the NEF 100/200 may perform authorization based on the NF/AF pair, which may result in the restriction of using the transfer service (e.g., period of time, maximum transfer amount of data, maximum transfer amount of data per time period, etc.) according to preconfigured policy. The restriction is reflected in the service admission control of the transfer service request/subscription at the NEF in proxy mode.

In summary, the disclosure provides a network entity 100/200 for a 5GS that is configured to:
  Support the registration of one or more external services (external network entity 101/201) inside the 5GS at a registration network entity 102. The registration can be provided to:
    Allow the information of the external service(s) to be explicitly available to other network entities 202; or
    Make the information hidden/masked from other network entities 202.
  Register, at the registration network entity 102, the information to support the other network entities 202 to discover external service(s) provided by the external network entity 101/201.
  Support the exchange of communication(s) (service traffic) between the network entities 202 and the external network entity 101/201, wherein the exchange of communication can be performed in:
    Proxy mode: The other network entities 202 communicate with the network entity 100/200 using a reference ID of the external service(s) or external network entity 101/201, wherein the actual message transfer (transfer of service traffic) between the network entities 202 and the external network entity 101/202 are transparent to the network entity 100/200. The network entity 100/200 controls the mapping of the messages in and out of the network, wherein the control can be performed in a:
      Centralized manner at the network entity 100/200.
      Distributed manner shared among the network entities 100/200, 210/201 and 202.

The present disclosure has been described in conjunction with various embodiments as examples as well as implementations. However, other variations can be understood and effected by those persons skilled in the art and practicing the claimed disclosure, from the studies of the drawings, this disclosure and the independent claims. In the claims as well as in the description the word "comprising" does not exclude other elements or steps and the indefinite article "a" or "an" does not exclude a plurality. A single element or other unit may fulfill the functions of several entities or items recited in the claims. The mere fact that certain measures are recited in the mutual different dependent claims does not indicate that a combination of these measures cannot be used in an advantageous implementation.

What is claimed is:

1. A method for supporting transfer of service traffic between an external network entity and a second network entity, the method comprising:
  receiving, by a first network entity, a first transfer request from the second network entity, wherein the first transfer request includes first service traffic; and
  sending, by the first network entity, a second transfer request to the external network entity, wherein the second transfer request includes the first service traffic, and wherein the second transfer request further includes correlation information between the first network entity and the first service traffic or the external network entity.

2. The method according to claim 1, further comprising: exposing, to other network entities, the second transfer request based on a configuration information.

3. The method according to claim 2, wherein the configuration information includes at least one of: an identification (ID) or address of a source/destination network entity, an ID of a service, a bit rate, a traffic volume, or a time duration.

4. The method according to claim 1, wherein:
the first network entity is a network exposure function (NEF);
the second network entity is a network function (NF); or
the external network entity is an application function (AF).

5. The method according to claim 1, wherein the first transfer request further includes at least one of:
an identification (ID) of a service;
an ID of the first transfer request;
an ID of the external network entity; or
a container with the to be transferred service traffic.

6. The method according to claim 1, further comprising:
receiving, by the first network entity, a third transfer request from the external network entity, wherein the third transfer request includes second service traffic; and
sending, by the first network entity, a fourth transfer request to the second network entity, wherein the fourth transfer request includes the second service traffic.

7. The method according to claim 1, further comprising:
obtaining, by the first network entity, a first registration information of the external network entity, wherein the first registration information includes a profile of the external network entity;
providing, by the first network entity, a second registration information, to the second network entity, wherein the second registration information includes profile information based on the profile of the external network entity;
obtaining, by the first network entity, a first registration response from the second network entity; and
providing, by the first network entity, a second registration response to the external network entity.

8. The method according to claim 7, wherein the first registration information further includes addressing information related to the external network entity to be used for invoking the service of the external network entity.

9. The method according to claim 7, wherein the second registration information further includes at least one of:
information about one or more network entities serving as a proxy for the external network entity;
Ssingle network slice selection assistance information (S-NSSAI) associated with the service of the external network entity;
a data network name (DNN) associated with the service of the external network entity; or
an identification (ID) of one or more user equipment (UE) associated with the external network entity.

10. The method according to claim 1, further comprising:
obtaining, by the first network entity, a discovery request from the external network entity for discovering one or more network services;
providing, by the first network entity, the discovery request to the second network entity;
obtaining, by the first network entity, a discovery response from the second network entity; and
providing, by the first network entity, the discovery response to the external network entity.

11. A method for consuming a service provided by an external network entity, the method comprising:

sending, by a second network entity, a first transfer request to a first network entity, wherein the first transfer request includes first service traffic;
receiving, by the second network entity, a fourth transfer request from the first network entity, wherein the fourth transfer request includes second service traffic;
obtaining, by the second network entity, a second registration information from the first network entity, wherein the second registration information includes profile information based on a profile of the external network entity; and
providing, by the second network entity, a first registration response to the first network entity.

12. The method according to claim 11, further comprising:
discovering, by the second network entity, the service by invoking a service discovery at another network entity, wherein the service discovery at another network entity comprises a service discovery at a network repository function (NRF).

13. A computer program product comprising non-transitory computer readable storage medium, wherein the non-transitory computer readable storage medium comprises instructions, which when executed by a computer, cause the computer to:
receive a first transfer request from a second network entity, wherein the first transfer request includes first service traffic;
send a second transfer request to an external network entity, wherein the second transfer request includes the first service traffic;
obtain a first registration information of the external network entity, wherein the first registration information includes a profile of the external network entity;
provide a second registration information to the second network entity, wherein the second registration information includes profile information based on the profile of the external network entity;
obtain a first registration response from the second network entity; and
provide a second registration response to the external network entity.

14. The computer program product according to claim 13, wherein the instructions, which when executed by the computer, further cause the computer to: expose to other network entities the second transfer request based on a configuration information.

15. The computer program product according to claim 14, wherein the configuration information includes at least one of: an identification (ID) or address of a source/destination network entity, an ID of a service, a bit rate, a traffic volume, or a time duration.

16. The computer program product according to claim 13, wherein the first transfer request further includes at least one of:
an identification (ID) of a service;
an ID of the first transfer request;
an ID of the external network entity; or
a container with the to be transferred service traffic.

17. The computer program product according to claim 13, wherein the instructions, which when executed by the computer, further cause the computer to:
obtain, a discovery request from the external network entity for discovering one or more network services;
provide the discovery request to the second network entity;

obtain a discovery response from the second network entity; and provide the discovery response to the external network entity.

* * * * *